United States Patent
Hughes

(10) Patent No.: US 7,412,247 B2
(45) Date of Patent: Aug. 12, 2008

(54) REMOTE LOCATION BASED SERVICES

(75) Inventor: Ian Hughes, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 10/871,915

(22) Filed: Jun. 18, 2004

(65) Prior Publication Data

US 2005/0003834 A1    Jan. 6, 2005

(30) Foreign Application Priority Data

Jun. 26, 2003  (GB) .................................... 0314903

(51) Int. Cl.
*H04Q 7/20* (2006.01)
(52) U.S. Cl. .................. 455/456.1; 455/410; 455/414.2
(58) Field of Classification Search .............. 455/414.1, 455/414.2, 410, 411, 432.1, 432.2, 435, 456.1, 455/456.3
See application file for complete search history.

(56) References Cited

U.S. PATENT DOCUMENTS

| | | | | |
|---|---|---|---|---|
| 6,075,853 A | * | 6/2000 | Boeckman et al. ..... | 379/221.09 |
| 6,950,662 B2 | * | 9/2005 | Kumar ..................... | 455/456.3 |
| 6,961,578 B2 | * | 11/2005 | Silver et al. ............. | 455/456.3 |
| 7,224,966 B2 | * | 5/2007 | Caspi et al. .............. | 455/419 |
| 2002/0077122 A1 | | 6/2002 | Yule ......................... | 455/456 |
| 2003/0013449 A1 | * | 1/2003 | Hose et al. ................ | 455/440 |

FOREIGN PATENT DOCUMENTS

EP    1 148 754 A2    10/2001

* cited by examiner

*Primary Examiner*—George Eng
*Assistant Examiner*—Sam Bhattacharya
(74) *Attorney, Agent, or Firm*—Scully, Scott, Murphy & Presser, P.C.; William H. Steinberg, Esq.

(57) ABSTRACT

The invention relates to a method, system and service for processing at a remote device a request from a first device, the method has the steps of receiving a request message to obtain information on location based services available at the physical location of the remote device from the first device, determining a user defined query in the request message, routing the query to an appropriate response service, formulating the response from the response service into a response message, and routing the response message to the first device.

1 Claim, 4 Drawing Sheets

REMOTE LOCATION BASED SERVICES

FIELD OF THE INVENTION

The invention relates to the field of telecommunication systems and in particular relates to processing a request at a remote device from a first device to obtain information on location based services at the physical location of the remote device.

BACKGROUND OF THE INVENTION

In this fast and increasingly connected world, people require information on demand. People do not want to wait until they get home to watch the news on the television or to listen to the radio to get the news. People want the information brought to them now, in real-time.

The same can be said for information that is location sensitive, people want to know what services are available to them in their current physical location. By services it is meant restaurants, cinemas, sporting events, art galleries, fuel supplies and the like. Location sensitive services are also referred to as location based services and are available to a user of a wireless device from a service provider.

Location based services operate on the principle of geographical triggers. A geographical trigger could be the name of a street, the name of a town, a postcode or the position of a vehicle. The location based information can be used to provide information to a user on what is available to them at their current location, such as, for example, 'where is my nearest Italian restaurant?' or 'where is my nearest theater and what time is a particular show starting?'

A user can use a plurality of means for obtaining location based services. One example is using a website to enter the name of the town where the user is physically located along with a search criterion of the services that they are looking for. In this instance the name of the town will form the geographical trigger, but this method requires a user to know where they are or where they want to be.

Another example is 'what if a person does not know where they are?' In this example the user can use their wireless device to ask the question 'where am I?' and 'what is available where I am?'. In most wireless devices it has become feasible to include a position location function. One such location position function can be found by logging onto a Wireless Application Providers (WAP) website where it is possible to use a function called 'where am I?' (an example is of this is a product known as ®VIZZANI). VIZZANI is provided by and is a registered trademark of Vizzavi Europe Limited and Vizzavi UK Limited.

Using the function provided by VIZZAVI the location position function returns the address of the current location of the wireless device and this information is used as an input as a starting destination for directions to another destination.

The location positioning function can be based on Observed Time Difference (ODT), Timimg Advance (TA) data, Time of Arrival or more commonly the Global Positioning System (GPS).

GPS works on the principle of trilateration which locates four or more satellites out of a constellation of 24 earth orbiting satellites and calculates the distance between the four or more satellites to work out where a person is located. A drawback with using GPS is that it is expensive and as of yet not widely implemented in everyday devices.

Hence, location based services are based around an individuals current physical location and what is located at that location. For example a location based service may be one that provides a user with information about what restaurants are available in their current physical location.

A problem occurs when a user of a wireless device would like information that is relevant to a second user's physical location; for example, if a user of a wireless device wants to contact another user of a wireless device who is located in a foreign country, but firstly needs to determine the timezone the user is in before making contact. Or a user of a wireless device needs to know whether a particular car dealership is available in the second user's location.

Therefore a method and system is provided for processing at a remote device a request from a wireless device to obtain information on location based services at the physical location of the remote device.

DISCLOSURE OF THE INVENTION

Accordingly, in a first aspect, the present invention provides a method for processing at a remote device a request from a first device, the method comprising the steps of: receiving a request message to obtain information on location based services available at the physical location of the remote device from the first device; determining a user defined query in the request message; routing the query to an appropriate response service; formulating the response from the response service into a response message; and routing the response message to the first device.

A user may formulate a request message comprising one or more queries requesting information on location based services available at a remote devices current location. Advantageously a user is able to request information on restaurants, theaters and the like, based on the location of a remote device wherein the remote device is located in a different geographical area to the first device requesting the information.

The remote device's location is determined by requesting the information from a home location register within a cellular communication system. A response agent (an intelligent agent) is deployed either on the remote device or in a cell to process the request message.

Utilizing cell technology the response agent may send a request message to the cell where the remote device is located, to request time and location information. An advantage of this approach is that GPS or other such position determining functions do not have to be used and thereby provides a service that is affordable and simple to deploy to all users of a wireless device.

In one embodiment, the response agent determines whether a response message is an authorized request; messages such as 'spam mail' and other unwanted requests would not be authorized and the response agent determines they are to be blocked.

A user may send a request message to a remote device by logging onto a service provider's WAP site or using technologies such as email, SMS and MMS directly from the user's wireless device.

In another embodiment a request message may contain multiple queries allowing for the response agent to query a plurality of data sources to locate a response to the request message. The response agent collates the responses to multiple queries in a response message which is routed via wireless transmission means defined in a user profile back to the requesting device.

According to a second aspect, the present invention provides a system for processing at a remote device a request from a first device, the system comprising: means for receiving a request message from the first device to obtain information on location based services available at the physical location of the remote device; means for determining a user defined query in the request message; means for routing the query to an appropriate response service; means for formulating the response from the response service into a response message; and means for routing the response message to the first device.

According to a third aspect, the present invention provides a remote location based service for a processing at a remote device a request from a first device, the method comprising the steps of: receiving from a first device a request message to obtain information on location based services available at the physical location of the remote device; determining a user defined query in the request message; routing the query to an appropriate response service; formulating the response from the response service into a response message; and routing the response message to the first device.

A telecommunications operator or a service provider may provide remote location based subscriber services that a user may subscribe to in order to access the information on location based services from a remote device.

BRIEF DESCRIPTION OF THE DRAWINGS

The invention will now be described by way of example only, with reference to the accompanying drawings, in which.

DETAILED DESCRIPTION OF THE INVENTION

Figure 1:
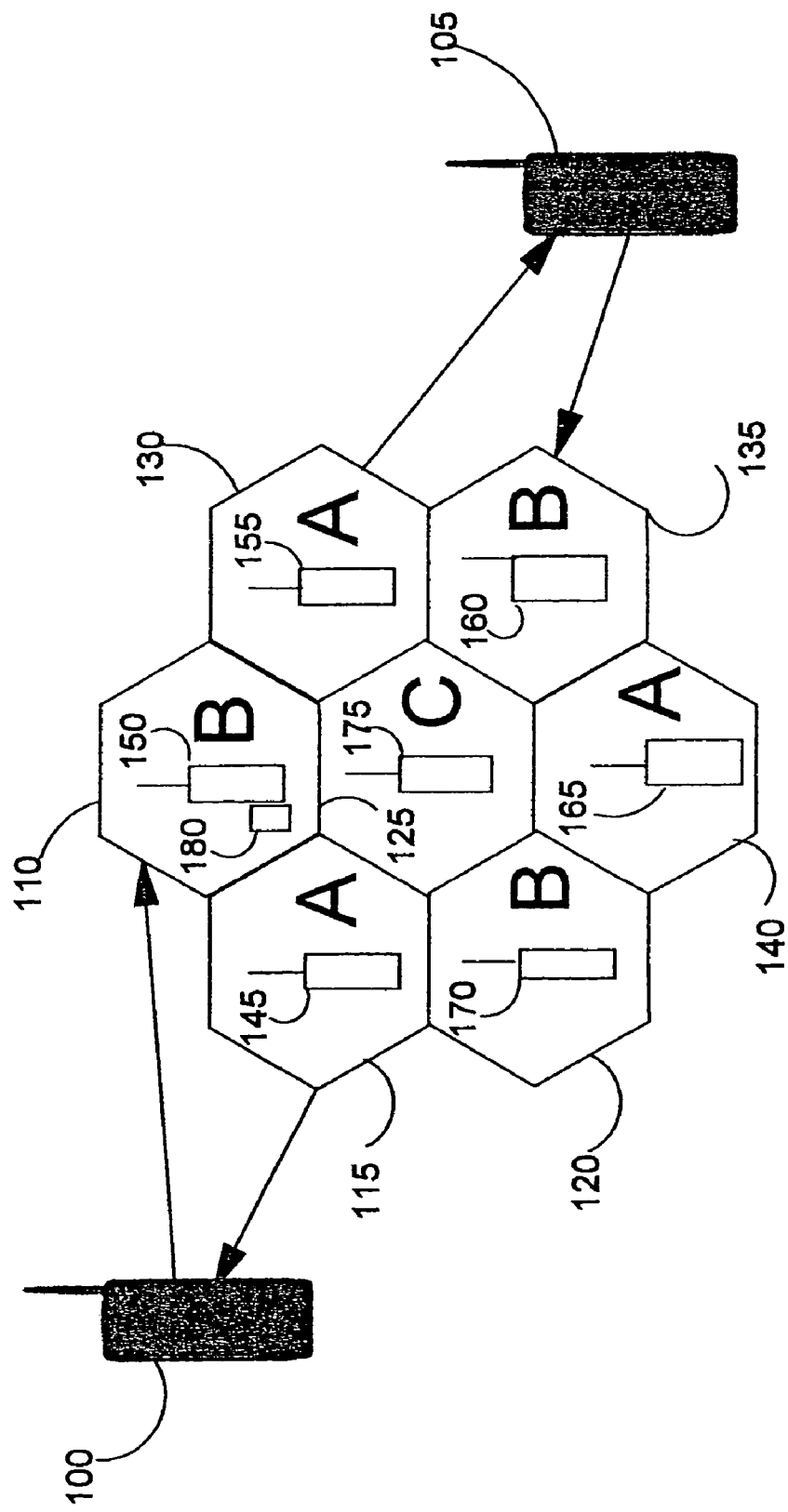
FIG. 1 illustrates a cellular communication system as is known in the art.

FIG. 1 depicts a simplified block diagram illustrating a wireless communication system 1 as is known in the art. The wireless communication system 1 comprises a plurality of wireless devices 100 and 105. A wireless device is defined as a mobile telephone, a pager, a personal digital assistant (PDA) or other types of wireless terminals.

A wireless communication network is organized into cells 110 to 140 and each cell comprises a base station 180 which controls the frequency band at which the wireless device 100 can transmit. The wireless devices 100 and 105 communicate with a mobile transmitter and receiver each located in a cell 110.

In FIG. 1 each cell 110 to 140 has a letter which represents the transmitting and receiving frequencies assigned to the cell 110 to 140. For example cell C 125 has a range frequency indicated by the letter 'C'. Cells 115, 110, 130, 120, 135 and 140 have different frequencies assigned to each cell denoted by the various letters and no two adjacent cells 110 and 115, 130 and 135 etc. have the same set of frequencies assigned to them.

Each cell 110 to 140 is located in a particular physical location and covers a relatively small area determined by a service provider. Each cell will have certain functions already installed within the cell 110 and these functions include the local time and the designated position.

A mobile switching center (MSC) 145 to 175 is located within each cell 110 to 140 and is used to coordinate the frequencies used by different wireless users and cell transmitters. The MSC 145 to 175 provide the functionality required to handle a wireless device, such as registration, authentication, location updating and call routing.

As the wireless device 100 moves out of a cell the MSC 145 to 175 must decide which is the correct cell to take over the call. The MSC can communicate with all wireless devices 100 and 105 in the areas of the base stations 180 which it controls by means of a control channel. The control channel allows the MSC 145 to 175 to send instructions to the wireless devices 100 and 105. The MSC 145 to 175 contacts each adjacent cell and instructs it to measure the signal strength of the wireless device. The results are transmitted back to the MSC 145 to 175 and the strongest signal and the selected cell 110 to 140 are determined.

The MSC 145 to 175 further comprises a Home Location Register (HLR) and a Visitor Location Register (VLR). The HLR provides the administrative information for each subscriber registered in the network (for example a GSM network) along with the current location of the wireless device 100. The location of the wireless device 100 is typically in the form of a signaling address of the VLR associated with the base station 180. The VLR contains selected administrative information from the HLR necessary for call control and provision of subscribed services.

The location updating procedures and subsequent call routing, use the MSC 145 to 175 and two location registers: the Home Location Register (HLR) and the Visitor Location Register (VLR). When a wireless device 100 is switched on in a new location area, or it moves to a new location area, it must register with the network to indicate its current location. Usually a location update message is sent to the new MSC/VLR, which records the location area information, and then sends the location information to the subscriber's HLR.

Figure 2:
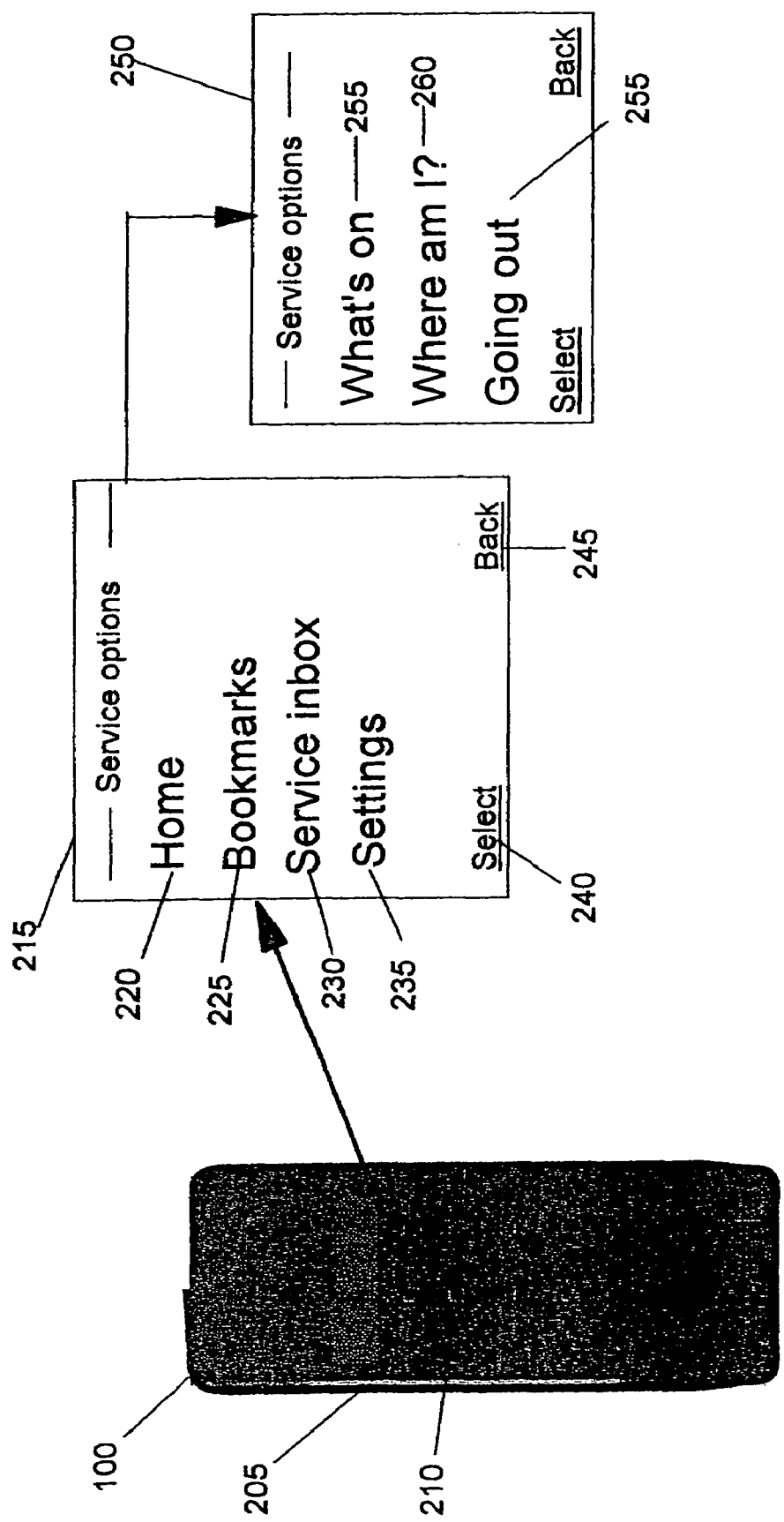
FIG. 2 illustrates a typical mobile device and a Wireless Application Protocol (WAP) site as is known in the art.

FIG. 2 illustrates a representation of a wireless device 100 and a service providers WAP site as known in the art. For the purposes of this example, the wireless device 100 is a mobile phone comprising a display 205 and a plurality of keys 210 for inputting data into the mobile phone. The mobile phone further comprises extra computing functions such as, the Wireless Application Protocol (WAP) for accessing the Internet. WAP enables manufactures, network operators, content providers and application developers to offer compatible products and secure services on all devices and networks.

A WAP site can be accessed by the wireless device 100 by logging on to a WAP site provided by a service provider. Once logged onto the WAP site a menu 215 is displayed on the display 205 of the wireless device 100 with various links that a user may select. For example, the link 'home' 220, takes a user to their home page that has been book marked, 'bookmarks' 225 for a stored list of bookmarks, 'service inbox' 230 for storing emails and 'settings' 235 for configuring WAP settings. By selecting a 'select' link 240 a user is able to select and load a further menu 250 onto their wireless device 100. The menu 250 displays further links for example 'what's on' 255, 'where am I' 260 and 'going out' 265. By selecting 'back' 245 a user can navigate back to a previous page.

In accordance with a preferred embodiment of the present invention, a user may request information on location based services available at the location of the remote device, by logging onto a service provider's WAP site in the manner described above. From the location based service WAP site the user formulates a request message detailing the information to be requested. The request message may comprise one or more queries requesting information. The following is an example of a request message

EXAMPLE 1

Figure 3:
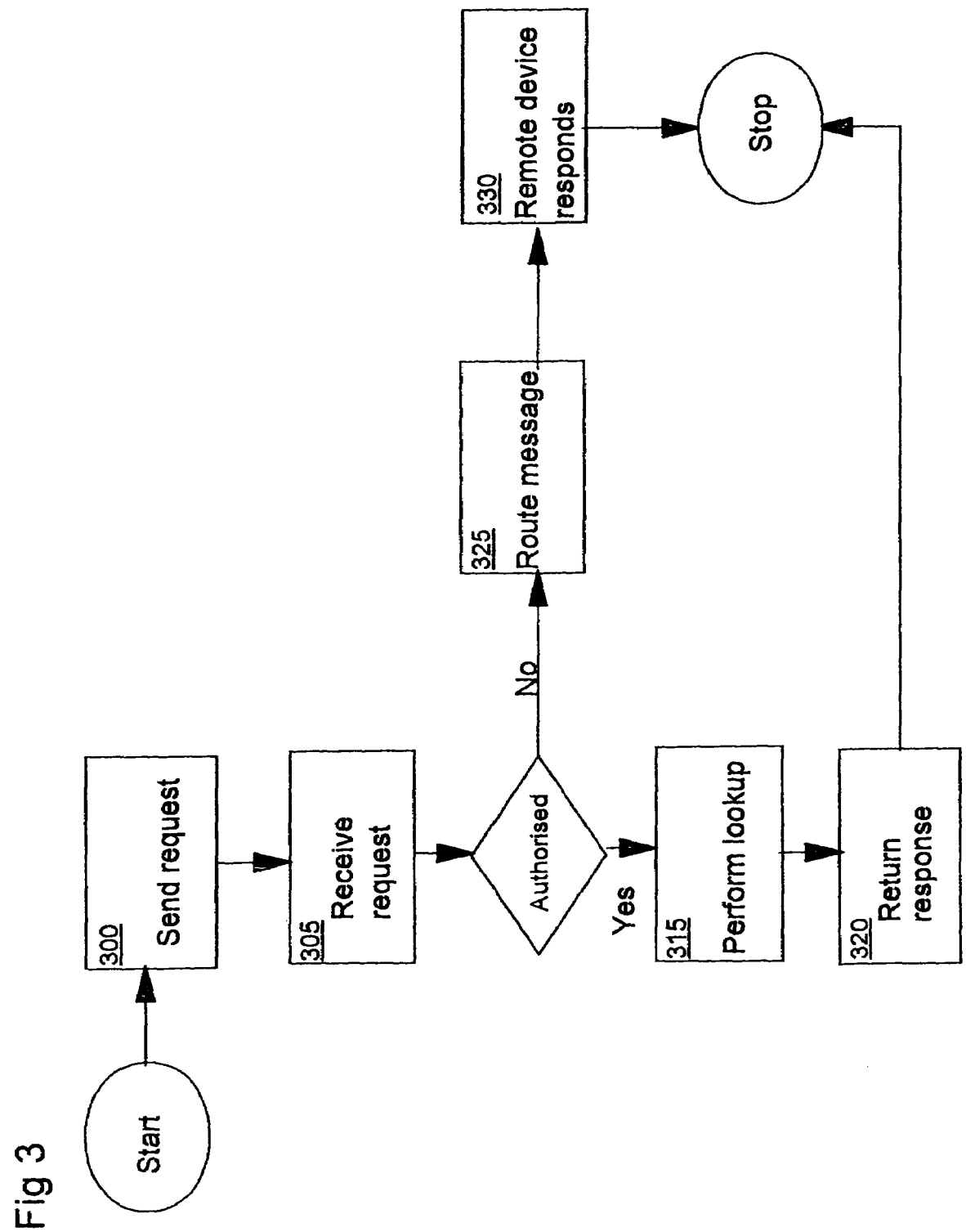
FIG. 3 illustrates in accordance with a preferred embodiment of the present invention, a first device requesting a list of location based service from a remote device.

Phone number of remote device: 01569 978903
Query #1: restaurants, Italian
Query #2: theaters, what is showing Referring to FIG. 3 the user of the wireless device 100 sends the request message to the remote device. The remote device may be identified by the remote device's phone number as is shown in example 1 above, or other identification means such as a user name and a password.

Each request message sent to a remote device is tagged with a markup language such as XML. An example of a tagged request message is illustrated in example 2.

EXAMPLE 2

<messageLookup>
    <ID> 07787 598164 </ID>
    <Subject>TimeThere</subject>
    <ActionLookup>(Time local to response agent): Respond directly to sender</ActionLookup>
<messageLookup Each request message is tagged with an ID of the remote device, a subject and an action tag. The ID tag informs the response agent from whom the request message originated, the subject tag informs a response agent about the type of information requested and lastly, the action tag informs the response agent the type of lookup query to be performed in order to obtain the requested information.

The response agent is an application protocol interface (API) installed on each wireless device. The response agent accepts and inspects all the transmitted messages from the device 100 to the remote device 105 to determine one or more queries.

The remote device 105 receives the request message over a wireless transmission channel at step 305. The response agent inspects the identification tag of the request message to determine whether the request message is an authorized request.

If the request message is not an authorized request control passes to step 320 and the request from the device 100 is routed to the remote device 105 using normal transmission channels. It is then the responsibility of the user of the remote device to manually respond to the request at step 330. The manual response may be in the form of an Short Message Service (SMS) or a voice call.

An unauthorized request can be any request from a user of a device to whom the user of the remote device does not wish to disclose location based information. To protect a user's privacy user profiles are set up to detail which phone numbers or user ID's are blocked from accessing the location based information. Each wireless device will preferably have a user profile associated with it and the response agent will inspect the user profile each time it receives a request.

Figure 4:
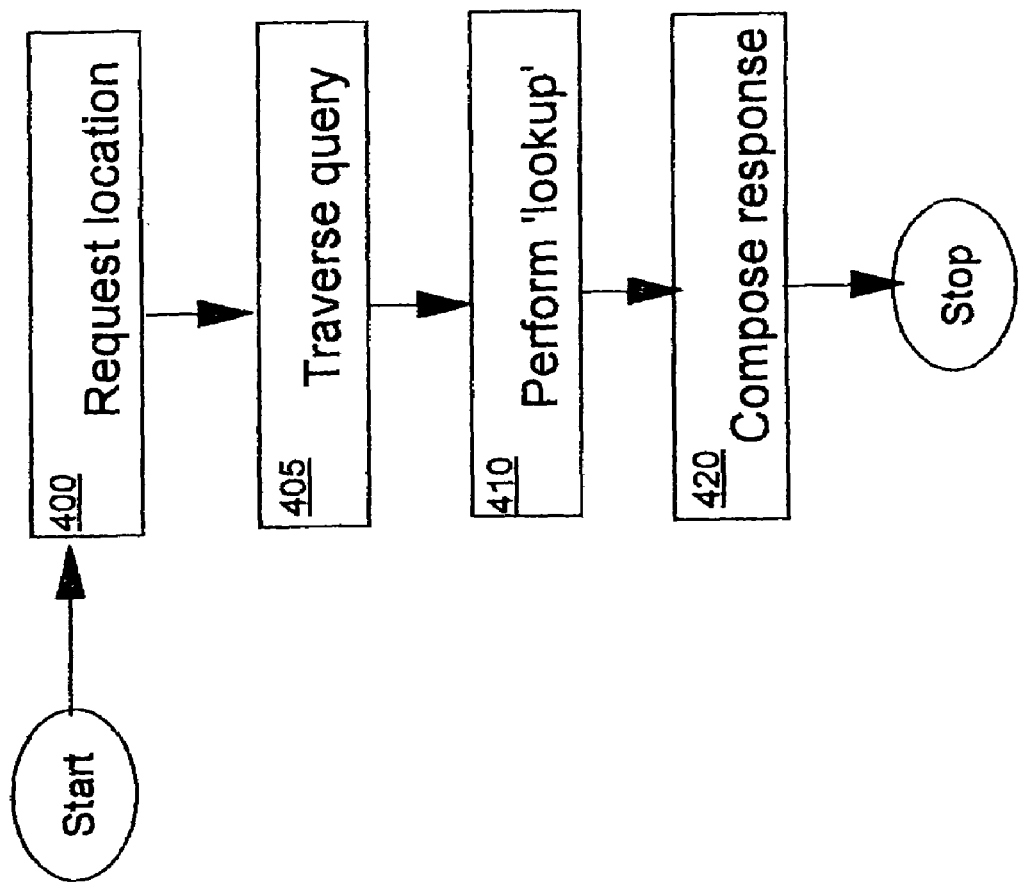
FIG. 4 illustrates the steps that the response agent performs when processing a request message, in accordance with a preferred embodiment of the present invention.

If the response agent determines that the request is an authorized request, control passes to step 315. Step 315 will be explained with reference to FIG. 4.

To determine the location based services available at the physical location of the remote device, the response agent requests the physical location of the remote device by sending a query request to the HLR in the MSC 145 to ask for the location of the remote device at step 400.

In another embodiment it is possible for the wireless device 105 to store information on its physical location in a memory register (not shown). When a wireless device joins a new cell 110 the HLR broadcasts location information to the wireless device 105, which is saved into the memory register.

Once the response agent receives a response message comprising the physical location of the remote device, the response agent traverses the remainder of the request message to determine further query lookups to perform at step 405.

Example 3 illustrates a request message tagged with multiple subject tags and multiple action tags.

EXAMPLE 3

<messageLookup>
    <ID> 03345 600700 </ID>
    <Subject>TimeThere</subject>
    <ActionLookup>(Time local to response agent): Respond directly to sender</ActionLookup>
    <Subject>RestuarantThere</subject>
    <Action RequestCentrally>(This, "Restaurant"): Respond with result
    Else: Pass message on to standard message service (user)
    </Action RequestCentrally>
</messageLookup>

Referring to example 3, each of the subject tags and action tags will be explained. The subject tag identifies to the response agent what type of information is being requested; in example 3 the subject is 'TimeThere' meaning what is the time where the remote device 105 is physically located.

The next line of the request message is tagged with an 'ActionLookUp' tag, which requests the response agent to 'lookup' the local time of the remote device 115; this can either be carried out by sending a request message directly to the remote device itself, or alternatively, the response agent can send a request to the HLR to ask for the local time in the cell that the remote device is a user is requesting i.e. English, Italian, Mexican, Spanish, Chinese and the like. physically located within at step 410.

Once the response agent has received the local time it then proceeds to traverse the request message tag by tag until there are no further 'lookups' to perform.

Example 3 comprises a second tagged subject entitled 'RestaurantThere' which means what restaurants are available in the remote device's 105 current location. It is possible to further modify this query to detail which type of restaurant.

According to the type of 'lookup' to be performed the response agent routes the 'lookup' query to the appropriate response service at step 410. A response service may be managed by a service provider or a telecoms operator.

Different service providers and telecoms operators may supply different services and within these services it is possible to interrogate a plurality of data stores to locate the requested information. For example a service provider may hold data stores containing information about restaurants in a particular of cells. The position of each cell is registered centrally within the telecommunications geographical area whereas a telecoms operator may hold one or more data stores containing information on theaters in a particular geographical area.

The response agent can send a query to each of these data stores to locate the requested information. For example the request message may contain two requests: a) French restaurants and b) is a particular film showing? The response agent determines the current physical location of the remote device and a response is sent back stating information.

In another embodiment a telecommunications operator may manage a matrix operator's management system (TOMS). The response agent sends a query to the TOMS associated with the cell wherever the remote device is physically located and requests the queried information. Once the cell has identified that it should respond to a particular request a response message is sent back to the response agent on the remote device and the response agent performs the action required. The service offered by TOMS may either be held centrally by the telecommunications operator or locally replicated to each cell.

Once all the requested information has been received by the response agent from the appropriate response services, the response agent formulates a response message to the device 100 at step 420 and referring back to FIG. 3 the response message is routed to the device 100 over the wireless transmission channel.

Example 4 details a return message.

EXAMPLE 4

Message:
  Subject: "what is the time there"
  Sender: "Ian"
  Target: "Tracey"
  Content: 10:00 am, restaurants available—Golden Palace Each returned message may comprise a subject header field detailing the subject of the request sent to the remote device; for example a user may have requested several location based services from several remote devices and therefore it is important to know which return message is in response to which request. The return message may comprise a sender field which informs the requesting device which device has sent the response.

The return message may further comprise a target field detailing to whom the remote device 105 is sending the return message and a content field detailing the requested information.

In example 4 the content field contains the time of the remote device 105 and the restaurants that are available at the physical location of the remote device 105.

In a further embodiment of the present invention, utilizing existing SMS technology (such that a user does not have to log onto a service providers WAP site) and installing the response agent in the cell 110 to 145, a user can enter into their wireless device 100, 105 an SMS message detailing the information to be requested.

SMS is a text messaging facility that enables text messaging between mobile phones. However the teachings of this invention are not limited to SMS and any wireless messaging technique can be used such as, for example email. Furthermore enhancements to SMS can be used; for example Multimedia Messaging Service (MMS) wherein image messages, video messages, studio messages, text messages, executables and the like can be transferred between wireless devices.

A typical SMS may take the form shown in example 5.

EXAMPLE 5

Number to send request to: 07787 561234
Request: location
Request: restaurant, Italian Each SMS request message details a query for one or more pieces of information. For example, in example 5 the request is for the location of a remote device and a list of Italian restaurants in the remote device's location. Once the user has formulated the SMS query and entered the phone number of the remote device 115, the SMS query is routed to the cell 110 where the remote device is currently located.

The response agent installed in the cell 110 proceeds to carry out steps 305, 310, 315, 320 and 325 of FIG. 3.

While there have been shown and described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method for processing at a remote device a request from a first device, the method comprising the steps of:
  receiving a request message sent from a first device to a second, remote device to obtain information on location based services available at the physical location of the remote device;
  determining a user defined query in the request message;
  routing the query to an appropriate response service;
  formulating the response from the response service into a response message; and
  routing the response message to the first device;
  wherein:
  the first and second devices are part of a wireless cellular communication system including a plurality of geographically defined cells;
  the first and second devices are in different ones of said plurality of cells;
  the receiving step includes the steps of
  a user accessing a web site of the response service, formulating the request message, and sending the request message from the first device to the second device; and
  said request message includes
    i) an identification of the remote device,
    ii) a subject identifying the type of information requested, and
    iii) an action tag indicating the type of lookup query to be performed in order to obtain the requested information.

* * * * *